US010435595B2

(12) United States Patent
Kusumoto et al.

(10) Patent No.: US 10,435,595 B2
(45) Date of Patent: Oct. 8, 2019

(54) AQUEOUS DISPERSION AND LAMINATE

(71) Applicant: MITSUI CHEMICALS, INC., Tokyo (JP)

(72) Inventors: Masaya Kusumoto, Sodegaura (JP); Takuya Tamura, Sodegaura (JP)

(73) Assignee: MITSUI CHEMICALS, INC., Tokyo (JP)

( * ) Notice: Subject to any disclaimer, the term of this patent is extended or adjusted under 35 U.S.C. 154(b) by 60 days.

(21) Appl. No.: 15/525,264

(22) PCT Filed: Oct. 29, 2015

(86) PCT No.: PCT/JP2015/080520
§ 371 (c)(1),
(2) Date: May 8, 2017

(87) PCT Pub. No.: WO2016/076130
PCT Pub. Date: May 19, 2016

(65) Prior Publication Data
US 2018/0282596 A1  Oct. 4, 2018

(30) Foreign Application Priority Data
Nov. 12, 2014  (JP) ................................ 2014-229366

(51) Int. Cl.
*C09J 123/08* (2006.01)
*B32B 27/28* (2006.01)
(Continued)

(52) U.S. Cl.
CPC .......... *C09J 123/0869* (2013.01); *B32B 7/12* (2013.01); *B32B 27/08* (2013.01); *B32B 27/28* (2013.01);
(Continued)

(58) Field of Classification Search
CPC .......... C09J 123/0869; C09J 7/29; B32B 7/12
See application file for complete search history.

(56) References Cited

U.S. PATENT DOCUMENTS

| 5,728,767 A | 3/1998 | Kanetou et al. |
| 2008/0287594 A1 | 11/2008 | Kashihara |
| 2018/0282596 A1* | 10/2018 | Kusumoto .............. B32B 27/28 |

FOREIGN PATENT DOCUMENTS

| JP | S57-137339 A | 8/1982 |
| JP | H08-067726 A | 3/1996 |

(Continued)

OTHER PUBLICATIONS

Translation of JP 57-137339. See IDS filed May 8, 2017 for date and inventor.*

(Continued)

*Primary Examiner* — Victor S Chang
(74) *Attorney, Agent, or Firm* — Foley & Lardner LLP (57) ABSTRACT

In an aqueous dispersion containing a resin component and water that allows the resin component to disperse, the resin component contains composite particles (C) containing an ethylene-unsaturated carboxylic acid copolymer (A) and an acrylic polymer (B), the ethylene-unsaturated carboxylic acid copolymer (A) is produced by copolymerizing a first monomer component containing ethylene and unsaturated carboxylic acid and having an ethylene content of 75 mass % or more, the acrylic polymer (B) is produced by polymerizing a second monomer component containing (meth)acrylate and having a (meth)acrylate content of 50 mass % or more, the acrylic polymer (B) has a glass transition temperature of −28° C. or more and 80° C. or less, and the ethylene-unsaturated carboxylic acid copolymer (A) content relative to the total amount of the resin component is 58 mass % or more and 90 mass % or less.

4 Claims, 1 Drawing Sheet

(51) Int. Cl.
  *B32B 27/30* (2006.01)
  *C09J 123/00* (2006.01)
  *C09J 133/06* (2006.01)
  *C08L 23/08* (2006.01)
  *C08L 33/04* (2006.01)
  *C09J 7/20* (2018.01)
  *C09J 7/29* (2018.01)
  *B32B 7/12* (2006.01)
  *B32B 27/08* (2006.01)

(52) U.S. Cl.
  CPC ............ *B32B 27/30* (2013.01); *B32B 27/304* (2013.01); *B32B 27/308* (2013.01); *C08L 23/08* (2013.01); *C08L 33/04* (2013.01); *C09J 7/20* (2018.01); *C09J 7/29* (2018.01); *C09J 123/00* (2013.01); *C09J 123/08* (2013.01); *C09J 133/06* (2013.01)

(56) References Cited

FOREIGN PATENT DOCUMENTS

| JP | 2001-179909 A | 7/2001 |
|----|---------------|--------|
| JP | 2002-105418 A | 4/2002 |
| JP | 2006-036920 A | 2/2006 |
| JP | 2011-046777 A | 3/2011 |
| JP | 5491099 B2 | 5/2014 |
| JP | 2014-208753 A | 11/2014 |
| JP | 6345705 B2 | 6/2018 |

OTHER PUBLICATIONS

Abstract of JP 57-137339. See IDS filed May 8, 2017 for date and inventor.*

International Preliminary Report on Patentability (Form PCT/IB/373) with Notification Concerning Transmittal of International Preliminary Report on Patentability (Form PCT/IB/326) dated May 26, 2017.

International Preliminary Report on Patentability (Form PCT/IB/373) with PCT Notification of Transmittal of Translation of the International Preliminary Report on Patentability (Form PCT/IB/338) dated May 26, 2017.

International Search Report issued in International Patent Application No. PCT/JP2015/080520 dated Jan. 19, 2016.

* cited by examiner

AQUEOUS DISPERSION AND LAMINATE

CROSS-REFERENCE TO RELATED APPLICATIONS

The present application is a U.S. national stage entry of International Patent Application No. PCT/JP2015/080520, filed Oct. 29, 2015, which claims the benefit of priority to Japanese Patent Application No. 2014-229366, filed Nov. 12, 2014, the entireties of which are hereby incorporated by reference.

TECHNICAL FIELD

The present invention relates to an aqueous dispersion and a laminate, in particular, to an aqueous dispersion, and a laminate produced by using the aqueous dispersion.

BACKGROUND ART

Conventionally, in various industrial fields, bonding substrates such as plastic films, vapor deposition films, metal foil, paper, and nonwoven fabric by heat pressure (that is, heat sealing) has been known. In heat sealing, generally, an adhesive layer is formed on the substrate in advance, and these substrates, or the substrate and another adherend are bonded with an adhesive layer interposed therebetween.

For the materials used in such heat sealing, a heat sealing material have been proposed. The heat sealing material includes a heat sealing adhesive composition and a substrate on which the heat sealing adhesive composition is applied. The heat sealing adhesive composition includes an emulsion in which resin particles are dispersed in water, and the resin particles contain olefinic polymer (A) and acrylic polymer (B) in the same particle. To be more specific, Patent Document 1 below proposed the following: a heat sealing adhesive composition is produced by polymerizing 55 parts of methylmethacrylate and 1-butylacrylate in the presence of 150 parts of polyolefin emulsion, and after the produced heat sealing adhesive composition is applied on paper and dried, the applied surfaces are subjected to heat sealing.

CITATION LIST

Patent Document

Patent Document 1: Japanese Unexamined Patent Publication No. 2001-179909 (Example 1)

SUMMARY OF THE INVENTION

Problem to be Solved by the Invention

Depending on the types of the substrate and the adherend, and on use, further improvement in adhesive strength and anti-blocking properties may be required.

An object of the present invention is to provide an aqueous dispersion with excellent adhesive strength and anti-blocking properties, and a laminate produced by using the aqueous dispersion.

Means for Solving the Problem

The present invention [1] includes an aqueous dispersion containing a resin component and water that allows the resin component to disperse,
wherein the resin component contains composite particles (C) containing an ethylene-unsaturated carboxylic acid copolymer (A) and an acrylic polymer (B), the ethylene-unsaturated carboxylic acid copolymer (A) is obtained by copolymerizing a first monomer component containing ethylene and unsaturated carboxylic acid and having an ethylene content of 75 mass % or more, the acrylic polymer (B) is obtained by polymerizing a second monomer component containing (meth)acrylate and having a (meth)acrylate content of 50 mass % or more, the acrylic polymer (B) has a glass transition temperature of −28° C. or more and 80° C. or less, and the ethylene-unsaturated carboxylic acid copolymer (A) content relative to the total amount of the resin component is 58 mass % or more and 90 mass % or less.

The present invention [2] includes the aqueous dispersion of the above-described [1] or [2], wherein the resin component further contains resin particles (E) composed of an olefinic polymer (D).

The present invention [3] includes a laminate including a substrate and an adhesive layer laminated on a surface of at least one side of the substrate, wherein the adhesive layer is obtained by drying the aqueous dispersion according to claim 1.

The present invention [4] includes the laminate of the above-described [3], further including an adherend layer laminated on a surface of one side of the adhesive layer.

The present invention [5] includes the laminate of the above-described [4], wherein the adherend layer is composed of polyvinyl chloride and/or polyvinylidene chloride.

Effects of the Invention

With the aqueous dispersion and the laminate produced by using the aqueous dispersion of the present invention, excellent adhesive strength and anti-blocking properties can be obtained.

DESCRIPTION OF EMBODIMENTS

The aqueous dispersion of the present invention contains a resin component, and water that allows the resin component to disperse.

The resin component contains composite particles (C) containing an ethylene-unsaturated carboxylic acid copolymer (A) and an acrylic polymer (B).

The ethylene-unsaturated carboxylic acid copolymer (A) is produced by copolymerizing a first monomer component.

The first monomer component contains ethylene and unsaturated carboxylic acid, and preferably consists of ethylene and unsaturated carboxylic acid.

The unsaturated carboxylic acid is a monomer having at least an ethylenic unsaturated bond and a carboxy group, and examples thereof include monobasic acids such as acrylic acid, methacrylic acid, and crotonic acid; and dibasic acids such as maleic acid, fumaric acid, and itaconic acid.

These unsaturated carboxylic acids may be used singly or in a combination of two or more.

For the unsaturated carboxylic acid, in view of water resistance, preferably, monobasic acids are used, and more preferably, acrylic acid and methacrylic acid are used.

Along with the unsaturated carboxylic acid, vinyl esters such as carboxylic acid vinyl esters including vinyl acetate and vinyl propionate can be used in combination. In such a case, the mixing ratio of the vinyl esters is set suitably in accordance with the purpose and application.

The first monomer component has an ethylene content and an unsaturated carboxylic acid content relative to their total of the following. The ethylene content is 75 mass % or more, preferably 78 mass % or more, and for example, 90 mass % or less, preferably 88 mass % or less. The unsaturated carboxylic acid content is, for example, 10 mass % or more, preferably 12 mass % or more, and 25 mass % or less, preferably 22 mass % or less.

When the ethylene content and the unsaturated carboxylic acid content are within the above-described range, excellent adhesive strength and anti-blocking properties can be obtained.

The polymerization of the first monomer component is not particularly limited, and a known polymerization method is used. For example, a method that can be used is a method in which the above-described first monomer component, and a known polymerization initiator such as peroxide are allowed to contact under conditions of high temperature and high pressure.

The ethylene-unsaturated carboxylic acid copolymer (A) can be produced as a dispersion in which the particles of the ethylene-unsaturated carboxylic acid copolymer (A) are dispersed in water. In such a case, the first monomer component can be polymerized by the method described in, for example, Japanese Examined Patent Publication Hei 7-008933, Japanese Examined Patent Publication Hei 5-039975, Japanese Examined Patent Publication Hei 4-030970, Japanese Examined Patent Publication Sho 42-000275, Japanese Examined Patent Publication Sho 42-023085, Japanese Examined Patent Publication Sho 45-029909, and Japanese Unexamined Patent Publication No. Sho 51-062890.

In production of the ethylene-unsaturated carboxylic acid copolymer (A), in view of achieving improvement in production stability, as necessary, an emulsifier (surfactant) described later can be blended. The mixing ratio of the emulsifier is set suitably in accordance with the purpose and application.

In production of the ethylene-unsaturated carboxylic acid copolymer (A), in view of achieving improvement in production stability, known additives such as, for example, a pH adjustment agent, for example, a sequestrant such as ethylenediaminetetraacetic acid and its salt, and for example, a molecular weight modifier (chain transfer agent) such as mercaptans and a low molecular weight halogen compound can be blended at a suitable ratio.

The ethylene-unsaturated carboxylic acid copolymer (A) is preferably neutralized and used in view of dispersion stability of the composite particles (C) and improvement in printability of the laminate (described later).

In neutralization, for example, a basic compound as a neutralizing agent is added to the ethylene-unsaturated carboxylic acid copolymer (A), to be specific, to the dispersion of the ethylene-unsaturated carboxylic acid copolymer (A).

Examples of the basic compound include inorganic basic compounds such as sodium hydroxide and potassium hydroxide, and organic basic compounds such as amines including ammonia, triethyamine, triethanol amine, and dimethylethanolamine.

These basic compounds may be used singly or in a combination of two or more.

For the basic compound, preferably, inorganic basic compounds are used, more preferably, sodium hydroxide is used.

The basic compound is added in an amount of, in view of achieving improvement in dispersion stability of the composite particles (C) and printability of the laminate (described later), relative to 100 mol of the carboxy group in the ethylene-unsaturated carboxylic acid copolymer (A), for example, 5 mol or more, preferably 30 mol or more, more preferably 50 mol or more, and for example, 200 mol or less, preferably 150 mol or less.

When the basic compound is added in an amount less than the above-described range, stability of the composite particles (C) in the aqueous dispersion may be reduced, and printability may be reduced. When the amount of the basic compound added is more than the above-described range, the aqueous dispersion may have a high viscosity, and workability may be reduced.

After the addition of the neutralizing agent, preferably, it is allowed to stand under a predetermined temperature for a predetermined time.

It is allowed to stand under the following conditions: a keeping temperature of, for example, 40° C. or more, preferably 50° C. or more, and for example, 90° C. or less, preferably 80° C. or less. The keeping time is, for example, 30 minutes or more, preferably 1 hour or more, and for example, 12 hours or less, preferably 10 hours or less.

By keeping under the above-described conditions, the carboxy group is neutralized, and dispersion stability of the composite particles (C) and printability of the laminate (described later) can be improved.

When the ethylene-unsaturated carboxylic acid copolymer (A) is neutralized, the degree of neutralization is, for example, 30% or more, preferably 50% or more, and for example, 200% or less, preferably 150% or less.

When the degree of neutralization is in the above-described range, excellent adhesive strength and anti-blocking properties can be obtained. The degree of neutralization is calculated in conformity with Examples described later.

The ethylene-unsaturated carboxylic acid copolymer (A) has a weight-average molecular weight of, by polystyrene standard calibration with gel permeation chromatography (GPC) measurement, for example, 10000 or more, preferably 30000 or more, for example, 200000 or less, preferably 150000 or less.

The ethylene-unsaturated carboxylic acid copolymer (A) has a melting point of, for example, 55° C. or more, preferably 65° C. or more, for example, 110° C. or less, preferably 100° C. or less. The melting point can be obtained by DSC (differential scanning calorimetry method).

The ethylene-unsaturated carboxylic acid copolymer (A) has a weight average particle size (measurement method: light scattering method) of, for example, 0.01 µm or more, preferably 0.02 µm or more, for example, 10 µm or less, preferably 1 µm or less.

In the dispersion of the ethylene-unsaturated carboxylic acid copolymer (A), the ethylene-unsaturated carboxylic acid copolymer (A) solid content concentration is, for example, 10 mass % or more, preferably 20 mass % or more, for example, 60 mass % or less, preferably 50 mass % or less.

The dispersion of the ethylene-unsaturated carboxylic acid copolymer (A) can be obtained as a commercially available product. Examples of the commercially available product include Chemipearl S100 (trade name, ethylene content in the material: 85 mass %, unsaturated carboxylic acid type: methacrylic acid, sodium hydroxide-neutralized, solid content 27%, manufactured by Mitsui Chemicals, Inc.), Chemipearl S80N (trade name, ethylene content in the material: 80 mass %, unsaturated carboxylic acid type: acrylic acid, ammonium hydroxide neutralized, solid content 24%, manufactured by Mitsui Chemicals, Inc.), and Chemipearl S650 (trade name, ethylene content in the material: 80 mass %, unsaturated carboxylic acid type: methacrylic acid, sodium hydroxide neutralized, solid content 27%, manufactured by Mitsui Chemicals, Inc.).

These ethylene-unsaturated carboxylic acid copolymers (A) may be used singly or in a combination of two or more.

The acrylic polymer (B) is produced by polymerizing a second monomer component.

The second monomer component contains (meth)acrylate as an essential component. The (meth)acrylate is defined as acrylate and/or methacrylate. The "(meth)acryl" described below also is defined as "acryl" and/or "methacryl".

Examples of the (meth)acrylate include (meth)acrylate having an alkyl moiety with 1 to 12 carbon atoms, including methyl (meth)acrylate, ethyl (meth)acrylate, propyl (meth)acrylate, n-butyl (meth)acrylate, iso-butyl (meth)acrylate, s-butyl (meth)acrylate, t-butyl (meth)acrylate, 2-ethylhexyl (meth)acrylate, and lauryl (meth)acrylate.

These (meth)acrylates may be used singly or in a combination of two or more.

For the (meth)acrylate, preferably, methyl (meth)acrylate, ethyl (meth)acrylate, n-butyl (meth)acrylate, iso-butyl (meth)acrylate, t-butyl (meth)acrylate, and 2-ethylhexyl (meth)acrylate are used, and more preferably, methyl (meth)acrylate and n-butyl (meth)acrylate are used, even more preferably, methyl methacrylate, n-butyl methacrylate, and butyl acrylate are used.

The second monomer component can contain, as an optional component, a copolymerizable monomer that is copolymerizable with (meth)acrylate.

Examples of the copolymerizable monomer include functional group-containing vinyl monomers, vinyl esters, aromatic vinyl monomers, N-substituted unsaturated carboxylic acid amide, heterocyclic vinyl compounds, vinylidene halide compounds, α-olefins, and dienes.

Examples of the functional group-containing vinyl monomer include a carboxy group-containing vinyl monomer, a hydroxyl group-containing vinyl monomer, an amino group-containing vinyl monomer, a glycidyl group-containing vinyl monomer, a cyano group-containing vinyl monomer, a sulfonic acid group-containing vinyl monomer, and their salts, an acetoacetoxy group-containing vinyl monomer, a phosphoric acid group-containing compound, and an amide group-containing vinyl monomer.

Examples of the carboxy group-containing vinyl monomer include (meth)acrylic acid, maleic anhydride, maleic acid, fumaric acid, itaconic acid, and crotonic acid.

Examples of the hydroxyl group-containing vinyl monomer include 2-hydroxyethyl (meth)acrylate and 2-hydroxypropyl (meth)acrylate.

Examples of the amino group-containing vinyl monomer include (meth)acrylic acid 2-aminoethyl, (meth)acrylic acid 2-(N-methylamino) ethyl, and (meth)acrylic acid 2-(N,N-dimethylamino) ethyl.

Examples of the glycidyl group-containing vinyl monomer include glycidyl (meth)acrylate.

Examples of the cyano group-containing vinyl monomer include (meth)acrylonitrile.

Examples of the sulfonic acid group-containing vinyl monomer include allylsulfonic acid and methallylsulfonic acid. Examples of the salts of the above-described sulfonic acid group-containing vinyl monomer include alkali metal salts such as sodium salt and potassium salts, and ammonium salt. To be specific, for example, sodium allylsulfonate, sodium methallylsulfonate, and ammonium methallylsulfonate are used.

Examples of the acetoacetoxy group-containing vinyl monomer include (meth)acrylic acidacetoacetoxyethyl.

Examples of the phosphoric acid group-containing compound include 2-methacryloxyethylacid phoshate.

Examples of the amide group-containing vinyl monomer include (meth)acrylamide.

Examples of the vinyl esters include vinyl acetate and vinyl propionate.

Examples of the aromatic vinyl monomer include styrene, α-methylstyrene, and divinylbenzene.

Examples of the N-substituted unsaturated carboxylic acid amide include N-methylol (meth)acrylamide.

Examples of the heterocyclic vinyl compound include vinylpyrrolidone.

Examples of the vinylidene halide compound include vinylidene chloride and vinylidene fluoride.

Examples of the α-olefins include ethylene and propylene.

Examples of the dienes include butadiene.

Furthermore, for the copolymerizable monomer, a crosslinkable vinyl monomer can also be used.

Examples of the crosslinkable vinyl monomer include a compound having two or more vinyl groups such as methylenebis(meth)acrylamide, divinylbenzene, and polyethylene glycol-chain containing di(meth)acrylate.

These copolymerizable monomers may be used singly or in a combination of two or more.

For the copolymerizable monomer, preferably, a functional group-containing vinyl monomer, an aromatic vinyl monomer, or a combination of these are used, and more preferably, an aromatic vinyl monomer is used singly.

The (meth)acryl as described above includes acryl and methacryl. However, in the second monomer component, in view of water resistance, preferably, methacryl is used.

In the second monomer component, the (meth)acrylate content and the copolymerizable monomer content are as follows. The (meth)acrylate content relative to the total amount of the second monomer component is 50 mass % or more, preferably 70 mass % or more, more preferably 77 mass % or more. The copolymerizable monomer content relative to the total amount of the second monomer component is 50 mass % or less, preferably 30 mass % or less, more preferably 23 mass % or less.

When the (meth)acrylate content and the copolymerizable monomer content are within the above-described range, excellent adhesive strength and anti-blocking properties can be obtained.

That is, the second monomer component may only contain the (meth)acrylate without containing the copolymerizable monomer, or may contain the (meth)acrylate and the copolymerizable monomer in combination at the above-described ratio. Preferably, the second monomer component consists of the (meth)acrylate, or consists both of the (meth)acrylate and the copolymerizable monomer at the above-described ratio.

When the second monomer component only contains the (meth)acrylate, even more preferably, the second monomer component only contains (meth)acrylate having an alkyl moiety of four carbon atoms, or contains a combination of (meth)acrylate having an alkyl moiety of one carbon atom and (meth)acrylate having an alkyl moiety of four carbon atoms.

When the second monomer component only contains the (meth)acrylate having an alkyl moiety of four carbon atoms, particularly preferably, it only contains n-butyl methacrylate, or contains a combination of n-butyl methacrylate and n-butyl acrylate.

When the second monomer component contains a combination of the (meth)acrylate having an alkyl moiety of one carbon atom and the (meth)acrylate having an alkyl moiety of four carbon atoms, particularly preferably, it contains a combination of methyl methacrylate and n-butyl methacrylate, or a combination of methyl methacrylate and n-butyl acrylate.

When the second monomer component contains a combination of the (meth)acrylate and the copolymerizable monomer, for the second monomer component, even more preferably, it contains a combination of the (meth)acrylate having an alkyl moiety of four carbon atoms and styrene, and particularly preferably, it contains a combination of n-butyl acrylate and styrene, or a combination of n-butyl methacrylate and styrene.

With such a second monomer component, the glass transition temperature of the acrylic polymer (B) can be adjusted to be within the range described later.

When the carboxy group-containing vinyl monomer is used as the copolymerizable monomer, the carboxy group-containing vinyl monomer content is, in view of production stability of the composite particles (C), relative to the total amount of the second monomer component, for example, 5 mass % or less, preferably 3 mass % or less. Preferably, the second monomer component contains no carboxy group-containing vinyl monomer.

The polymerization of the second monomer component is not particularly limited, and a known polymerization method is used. For example, water, the second monomer component and the polymerization initiator are blended, and the second monomer component is polymerized in water.

The polymerization initiator is not particularly limited, and examples thereof include hydrogen peroxide; persulfates such as ammonium persulfate, potassium persulfate, and sodium persulfate; organic peroxides such as cumene hydroperoxide, t-butylhydroperoxide, benzoyl peroxide, t-butylperoxy-2-ethylhexanoate, t-butylperoxybenzoate, and lauroylperoxide; azo compounds such as azobisisobutyronitrile; or redox initiators produced by combination of these examples of initiator and metal ion such as iron ion, and a reducing agent such as sodium sulfoxylate, formaldehyde, sodium pyrosulfite, sodium hydrogen sulfite, L-ascorbic acid, and rongalite. These polymerization initiators may be used singly or in a combination of two or more.

The mixing ratio of the polymerization initiator is set suitably in accordance with the purpose and application, and is, relative to the total amount of the second monomer component, for example, 0.1 mass % or more, and for example, 5 mass % or less.

In the polymerization, as necessary, a molecular weight modifier can be blended.

Examples of the molecular weight modifier include mercaptans such as t-dodecylmercaptan and n-dodecylmercaptan; allyl compounds such as allylsulfonate, methallylsulfonate, and their soda (sodium) salt. These molecular weight modifiers may be used singly or in a combination of two or more. The mixing ratio of the molecular weight modifier is set suitably in accordance with the purpose and application.

The polymerization conditions are as follows: under normal pressure, the polymerization temperature is, for example, 30° C. or more, preferably 50° C. or more, and for example, 95° C. or less, preferably 85° C. or less. The polymerization time is, for example, 1 hour or more, preferably 2 hours or more, and for example, 30 hours or less, preferably 20 hours or less.

In the production of the acrylic polymer (B), in view of achieving improvement in production stability, as necessary, an emulsifier (surfactant) can be blended.

Examples of the emulsifier (surfactant) include an anion surfactant, a nonionic surfactant, and a cation surfactant.

Examples of the anionic surfactant include sodium dodecylbenzene sulphonate, sodium lauryl sulfate, sodium alkyl diphenyl ether disulfonate, sodium alkyl naphthalene sulfonate, sodium dialkyl sulfosuccinate, sodium stearate, potassium oleate, sodium dioctyl sulfosuccinate, sodium polyoxyethylene alkyl ether sulfate, sodium polyoxyethylene alkyl ether sulfate, sodium polyoxyethylene alkyl phenylether sulfate, sodium dialkyl sulfosuccinate, sodium stearate, sodium oleate, and sodium tert-octylphenoxypolyethoxyethyl sulfate.

Examples of the nonionic surfactant include polyoxyethylenelaurylether, polyoxyethyleneoctylphenylether, polyoxyethyleneoleylphenylether, polyoxyethylenenonylphenylether, oxyethylene-oxypropylene block copolymer, tert-octylphenoxyethylpolyethoxyethanol, and nonylphenoxyethylpolyethoxyethanol.

Examples of the cationic surfactant include lauryltrimethylammoniumchloride and stearyltrimethylammoniumchloride.

These emulsifiers (surfactants) may be used singly or in a combination of two or more.

For the emulsifier (surfactant), preferably, an anionic surfactant is used, and more preferably, sodium dodecylbenzene sulphonate is used.

The mixing ratio of the emulsifier (surfactant) is not particularly limited, and in view of production stability of the composite particles (C), the mixing ratio of the emulsifier (surfactant) relative to the total amount of the second monomer component is, for example, 0.02 mass % or more, and for example, 5 mass % or less.

In production of the acrylic polymer (B), in view of achieving improvement in production stability, known additives including the following can be blended at a suitable ratio: for example, a pH adjustment agent, for example, a sequestrant such as ethylenediaminetetraacetic acid and its salt, and a molecular weight modifier (chain transfer agent) such as for example, mercaptans, and a low molecule halogen compound.

The acrylic polymer (B) has a weight-average molecular weight based on polystyrene standard calibration with gel permeation chromatography (GPC) measurement, for example, 5000 or more, preferably 10000 or more, and for example, 1000000 or less, preferably 500000 or less.

The acrylic polymer (B) has a glass transition temperature of −28° C. or more, preferably −10° C. or more, and 80° C. or less, preferably 60° C. or less.

When the acrylic polymer (B) has a glass transition temperature of the above-described range, excellent adhesive strength and anti-blocking properties can be obtained. The glass transition temperature can be measured in conformity with Examples described later.

The form of the composite particles (C) is not particularly limited as long as the above-described ethylene-unsaturated carboxylic acid copolymer (A) and acrylic polymer (B) are included, and for example, the structures can be the following: a structure in which the acrylic polymer (B) is dispersed in the continuous phase of the ethylene-unsaturated carboxylic acid copolymer (A), a core/shell structure, a composite structure, a localized structure, potbellied structure, octopus structure, raspberry structure, multiple particle structure, and IPN structure.

For the composite particles (C), a structure in which the acrylic polymer (B) is dispersed in the continuous phase of the ethylene-unsaturated carboxylic acid copolymer (A) is preferable.

The production method of such a composite particles (C) is not particularly limited, and a known method can be used.

For example, the composite particles (C) having a structure in which the acrylic polymer (B) is dispersed in the continuous phase of the ethylene-unsaturated carboxylic acid copolymer (A) can be produced by the following method.

That is, the composite particles (C) can be produced by first producing the ethylene-unsaturated carboxylic acid copolymer (A) by the above-described method, and then by producing the acrylic polymer (B) by the above-described method in the presence of the produced ethylene-unsaturated carboxylic acid copolymer (A).

The composite particles (C) can also be produced by, for example, first producing the acrylic polymer (B) by the above-described method, and then producing the ethylene-unsaturated carboxylic acid copolymer (A) by the above-described method in the presence of the produced acrylic polymer (B) (e.g., in dispersion).

Preferably, the composite particles (C) are produced by first producing the ethylene-unsaturated carboxylic acid copolymer (A), and then producing the acrylic polymer (B) in the presence of the produced ethylene-unsaturated carboxylic acid copolymer (A) (e.g., in dispersion). For the ethylene-unsaturated carboxylic acid copolymer (A), as described above, a commercially available product may be used.

In the composite particles (C), the ethylene-unsaturated carboxylic acid copolymer (A) content and the acrylic polymer (B) content are as follows: the ethylene-unsaturated carboxylic acid copolymer (A) content relative to the total amount of the ethylene-unsaturated carboxylic acid copolymer (A) and the acrylic polymer (B) is, for example, 1 mass % or more, preferably 5 mass % or more, more preferably 10 mass % or more, and for example, 95 mass % or less, preferably 70 mass % or less, more preferably less than 50 mass %. The acrylic polymer (B) content relative to the total amount of the ethylene-unsaturated carboxylic acid copolymer (A) and the acrylic polymer (B) is, for example, 5 mass % or more, preferably 30 mass % or more, more preferably more than 50 mass %, and for example, 99 mass % or less, preferably 95 mass % or less, more preferably 90 mass % or less.

When the ethylene-unsaturated carboxylic acid copolymer (A) content and the acrylic polymer (B) content are within the above-described range, excellent adhesive strength and anti-blocking properties can be obtained.

The ethylene-unsaturated carboxylic acid copolymer (A) content and the acrylic polymer (B) content in the composite particles (C) can be calculated from the ratio of the ingredient component charged.

The composite particles (C) have a weight average particle size (measurement method: light scattering measurement) of, for example, 10 nm or more, for example, 10 μm or less, preferably 1 μm or less.

The composite particles (C) have an average particle size observed by an electron microscope of, for example, 50 nm or more, preferably 60 nm or more, more preferably 80 nm or more, and for example, 300 nm or less, more preferably 200 nm or less, even more preferably 120 nm or less.

When the average particle size is within the above-described range, storage stability of the aqueous dispersion of the composite particles (C) can be improved, and excellent transparency and water resistance of a laminate (described later) can be achieved.

The aqueous dispersion may further contain resin particles (E) as a resin component, other than the above-described composite particles (C).

The resin particles (E) are particles composed of resin other than the composite particles (C), and to be specific, composed of an olefinic polymer (D).

Examples of the olefinic polymer (D) include polyolefin resin. To be specific, examples thereof include a homopolymer and a copolymer of α-olefin having 2 to 16 carbon atoms (e.g., ethylene, propylene, 1-butene, 3-methyl-1-butene, 4-methyl-1-pentene, 3-methyl-1-pentene, 1-heptene, 1-hexene, 1-octene, 1-decene, 1-dodecene, etc.).

Furthermore, for the olefinic polymer (D), other than the above-described ones, the ethylene-unsaturated carboxylic acid copolymer (A) is included.

That is, the resin component of the aqueous dispersion contains the ethylene-unsaturated carboxylic acid copolymer (A) in the composite particles (C), and furthermore, as the olefinic polymer (D) in the resin particles (E), the ethylene-unsaturated carboxylic acid copolymer (A) can be contained. In such a case, the ethylene-unsaturated carboxylic acid copolymer (A) as the olefinic polymer (D) in the resin particles (E) does not form a composite with the acrylic polymer (B), and is dispersed in the aqueous dispersion as independent particles that are different from the composite particles (C).

These olefinic polymers (D) may be used singly or in a combination of two or more.

For the olefinic polymer (D), preferably, the ethylene-unsaturated carboxylic acid copolymer (A) is used.

The ethylene-unsaturated carboxylic acid copolymer (A) used as the olefinic polymer (D) can be a type different from the ethylene-unsaturated carboxylic acid copolymer (A) in the composite particles (C), but preferably, the ethylene-unsaturated carboxylic acid copolymer (A) having the same composition as the ethylene-unsaturated carboxylic acid copolymer (A) contained in the composite particles (C) is used as the olefinic polymer (D).

When the resin particles (E) composed of the olefinic polymer (D) is blended in the aqueous dispersion, the blending method is not particularly limited, and for example, the dispersion of the composite particles (C) and the dispersion of the resin particles (E) can be mixed, and the resin particles (E) (solid content of the dispersion) can be added to the dispersion of the composite particles (C), and furthermore, the composite particles (C) (solid content of the dispersion) can be added to the dispersion of the resin particles (E).

Furthermore, the homopolymer particles composed of the ethylene-unsaturated carboxylic acid copolymer (A) (that is, resin particles (E) composed of olefinic polymer (D)) can also be formed, for example, by adjusting the amount of the first monomer component and the second monomer component in the production of the above-described of the dispersion composite particles (C) to form the composite particles (C), and separately from the composite particles (C).

When the resin particles (E) composed of the olefinic polymer (D) are blended, the resin particles (E) content relative to the total amount of the resin component (that is, total amount of the composite particles (C) and the resin particles (E)) is, for example, 5 mass % or more, preferably 10 mass % or more, and for example, 80 mass % or less, preferably 70 mass % or less.

The ethylene-unsaturated carboxylic acid copolymer (A) content (that is, the ethylene-unsaturated carboxylic acid copolymer (A) content in the composite particles (C), and when the resin particles (E) contains the ethylene-unsaturated carboxylic acid copolymer (A), the total amount of the ethylene-unsaturated carboxylic acid copolymer (A) content of the composite particles (C) and the ethylene-unsaturated carboxylic acid copolymer (A) content in the resin particles (E)) relative to the total amount of the resin component is 58 mass % or more, preferably 65 mass % or more, and 90 mass % or less, preferably 80 mass % or less. The other component content (acrylic polymer (B), etc.) is, 10 mass % or more, preferably 20 mass % or more, and 42 mass % or less, preferably 35 mass % or less.

When the ethylene-unsaturated carboxylic acid copolymer (A) content relative to the total amount of the resin component is within the above-described range, excellent adhesive strength and anti-blocking properties can be produced.

The ethylene-unsaturated carboxylic acid copolymer (A) content in the resin component can be calculated from the ratio of the ingredient component charged.

The aqueous dispersion may further contain, other than the above-described resin component, an additive.

Examples of the additive include known additives such as the above-described emulsifier, and also a curing agent, cross-linking agent, film-forming auxiliary agent, antifoaming agent, repelling prevention agent, leveling agent, tackifier, hardener, antiseptic, thickening agent, antifreeze agent, dispersing agent, inorganic pigment, and organic pigment. These additives may be used singly or in a combination of two or more. The mixing ratio of the additive and timing of blending are set suitably in accordance with the purpose and application.

The aqueous dispersion has a solid content concentration of, for example, 10 mass % or more, preferably 20 mass % or more, and for example, 60 mass % or less, preferably 50 mass % or less.

The aqueous dispersion has a pH of, for example, 7 or more, preferably 8 or more, for example, 11 or less, preferably 10 or less.

When such an aqueous dispersion is used for forming an adhesive layer (heat sealing layer) of a laminate, a laminate with excellent adhesive strength and anti-blocking properties can be obtained.

Therefore, the aqueous dispersion can be suitably used in a laminate including a substrate and an adhesive layer laminated on the surface of at least one side of the substrate as an adhesive composition forming an adhesive layer.

Figure 1:
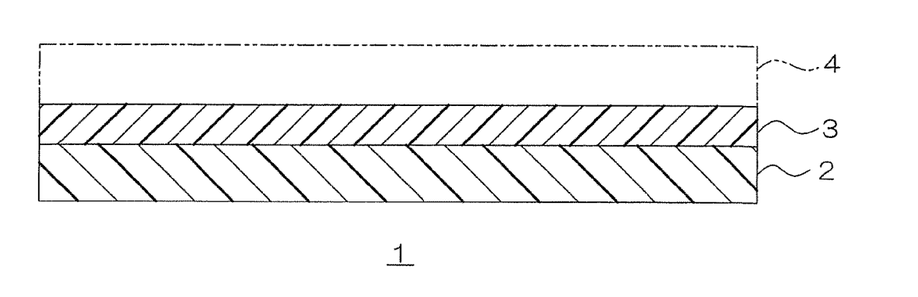
FIG. 1 is a schematic diagram illustrating an embodiment of the laminate of the present invention.

To be more specific, in FIG. 1, a laminate 1 includes a substrate 2 and an adhesive layer 3 laminated on one side surface of the substrate 2.

Examples of the substrate 2 include a plastic film composed of plastic materials such as cellophane, polyethylene, ethylene-vinyl acetate copolymer, ionomer, polypropylene, polyamide (nylon), polyester, polyvinyl chloride, polyvinylidene chloride, polyvinyl alcohol, ethylene-vinyl alcohol copolymer, polycarbonate, polystyrene, and a polyacrylonitrile copolymer; a vapor deposition film in which metals such as aluminum, gold, silver, copper, nickel, zinc, titanium, cobalt, indium, and chromium, and oxides such as aluminum oxide, and silicon oxide are vapor deposited on these plastic film; metal foil such as a aluminum foil; paper; and nonwoven fabric.

These substrates 2 may be used singly or in a combination of two or more.

For the substrate 2, preferably, metal foil, more preferably, aluminum foil is used.

The adhesive layer 3 can be produced by applying the above-described aqueous dispersion on one side surface of the substrate 2 and drying it.

The aqueous dispersion can be applied by any method and the method is not particularly limited. For example, known methods such as gravure application, roll application, immersion application, and spray application are used.

The drying conditions are as follows. The drying temperature is, for example, 100 to 200° C., and the drying time is, for example, 10 seconds to 30 minutes.

Before the application and drying, to improve adherence between the substrate 2 and the adhesive layer 3, a primer (titanate, polyethyleneimine, etc.) can be applied to the substrate 2, or pretreatment such as corona discharge treatment and passivation can be conducted.

In such a laminate 1, the above-described aqueous dispersion is used for the adhesive layer 3, and therefore excellent adhesive strength and anti-blocking properties can be obtained.

Therefore, the laminate 1 is used as a heat sealing material in various industrial fields.

In heat sealing, as shown in FIG. 1, the substrate 2 is allowed to adhere to the adherend layer 4 (ref: broken line in FIG. 1) with the adhesive layer 3 interposed therebetween.

The adherend layer 4 is a material to which the above-described laminate 1 adheres, and examples thereof include a plastic film composed of plastic materials such as cellophane, polyethylene, ethylene-vinyl acetate copolymer, ionomer, polypropylene, polyamide (nylon), polyester, polyvinyl chloride, polyvinylidene chloride, polyvinyl alcohol, ethylene-vinyl alcohol copolymer, polycarbonate, polystyrene, and a polyacrylonitrile copolymer; a vapor deposition film on which metals such as aluminum, gold, silver, copper, nickel, zinc, titanium, cobalt, indium, and chromium, and oxides such as for example, aluminum oxide, silicon oxide are vapor deposited; metal foil such as aluminum foil; paper; and nonwoven fabric.

For the adherend layer 4, the laminate 1 including the substrate 2 and the adhesive layer 3 can also be used.

These adherend layers 4 may be used singly or in a combination of two or more.

For the adherend layer 4, in view of adhesive strength and easy adhering, preferably, a plastic film composed of polyvinyl chloride and polyvinylidene chloride is used.

The method for heat sealing the substrate 2 and the adherend layer 4 is not particularly limited, and a known method is used. For example, as shown in FIG. 1, the substrate 2 and the adherend layer 4 are laminated with the adhesive layer 3 interposed therebetween, and thereafter, heated and pressed. When the laminate 1 is used as the adherend layer 4, the adhesive layers 3 are bonded to each other, and the two substrates 2 are laminated with the two-layer adhesive layer 3 interposed therebetween, and heated and pressed.

The heating temperature is, for example, 80° C. or more, preferably 100° C. or more, for example, 250° C. or less, preferably 200° C. or less. The pressure is, for example, 50 kPa or more, preferably 100 kPa or more, for example, 500 kPa or less, preferably 300 kPa or less.

The substrate 2 and the adherend layer 4 are subjected to heat sealing (thermocompression bonded) in this manner.

The laminate 1 in which the adherend layer 4 is laminated on one side surface of the adhesive layer 3 (in other words, laminate 1 including the adherend layer 4 laminated on one side surface of the adhesive layer 3) is included in the present invention despite the heat sealing conditions (that is, before or after heat sealing).

Such a laminate 1 has excellent adhesive strength and anti-blocking properties, and therefore can be suitably used in various industrial fields as a packing material.

The contents to be packed by the laminate 1 are not particularly limited, and includes, for example, various industrial products including foods such as snacks, tea leaves, and spices; aromatics such as tobacco and aromatic tree; pharmaceutical products; and paper.

EXAMPLE

In the following, the present invention is described in detail with reference to Examples and Comparative Examples, but the present invention is not limited thereto. The specific numeral values such as mixing ratios (content), physical property values, and parameters used in the description below can be replaced with the upper limit value (numeral values defined with "or less" or "less than") or the lower limit value (numeral values defined with "or more", "more than") of the corresponding mixing ratios (content), physical property values, and parameters.

Example 1

A reaction vessel was charged with 200 parts by mass of Chemipearl S 100 (ethylene content in the material: 85 mass %, unsaturated carboxylic acid type: methacrylic acid, sodium hydroxide neutralized product, solid content 27%, manufactured by Mitsui Chemicals, Inc.) as the ethylene-unsaturated carboxylic acid copolymer (A) and 27 parts by mass of deionized water; the temperature was increased under nitrogen flow to 80° C.; and 0.3 parts by mass of potassium persulfate was added. The degree of neutralization at that time was measured by the following method.

Separately, 100 parts by mass of n-butyl methacrylate and 0.2 parts by mass of n-dodecylmercaptan (molecular weight modifier) were emulsified with 0.4 parts by mass of sodium dodecylbenzenesulate (emulsifier) in 40 parts by mass of deionized water, and the produced emulsion mixture was dropped in the reaction vessel for 2 hours, and thereafter, it was allowed to stand at the same temperature for 2 hours, thereby completing the polymerization. The acrylic polymer (B) was formed, and a dispersion of the composite particles (C) was produced in this manner.

A portion of the aqueous dispersion was dried and the solid content particles were observed with an electron microscope. The composite particles (C) having a particle size of 80 to 120 nm, and having a structure in which n-butyl methacrylate is dispersed in a continuous phase of the ethylene-methacrylic acid copolymer (A) were observed. The glass transition temperature of the acrylic polymer (B) was calculated with the following method.

Then, 1 part by mass of polyoxyethylenelaurylether (emulsifier) was added, and thereafter, 911 parts by mass of Chemipearl S 100 (ethylene content in the material: 85 mass %, unsaturated carboxylic acid type: methacrylic acid, sodium hydroxide neutralized product, solid content 27%, manufactured by Mitsui Chemicals, Inc.) was added to the produced dispersion as the resin particles (E), and the mixture was mixed. Thereafter, the solid content of the mixture was adjusted with deionized water to 28 mass %, thereby producing an aqueous dispersion.

Examples 2 to 8 and Comparative Examples 1 to 8

An aqueous dispersion was produced in the same manner as in Example 1, except that the types and the mixing amount of the ethylene-unsaturated carboxylic acid copolymer (A), and the types and the mixing amount of the ingredient monomer (second monomer component) of the acrylic polymer (B), and the types of the mixing amount of the resin particles (E) were changed in accordance with Table 1.

In Comparative Example 5, the ethylene-unsaturated carboxylic acid copolymer (A) and the acrylic polymer (B) were produced separately, and mixed in accordance with the ratio shown in Table 1 without producing the acrylic polymer (B) in the presence of the ethylene-unsaturated carboxylic acid copolymer (A).

<Measurement Method>

1) Degree of Neutralization

The infrared absorption spectrum of the sample was measured, and the peak height of 1700 cm$^{-1}$ corresponding to the carboxy group was obtained (peak height was noted as a).

The sample was allowed to contact with hydrochloric acid to remove the metal ion in the resin (demetallization), thereby producing an acid copolymer having no ionic bond (inner molecular crosslinking). The infrared absorption spectrum of the sample of the acid copolymer was measured, and the peak height of absorption of 1700 cm$^{-1}$ was obtained (peak height was noted as b).

The peak height a corresponds to the number of the carboxyl group having no ionic bond in resin.

The peak height b corresponds to the number of the all carboxyl group in the resin.

Then, the degree of neutralization (%) was obtained with the formula below.

$$\text{Degree of neutralization (\%)}=100-100\times a/b$$

2) Glass Transition Temperature

The glass transition temperature was obtained by the method described in Computational Materials Science of Polymers (A. A. Askadskii, Cambridge Intl Science Pub (2005, Dec. 30)) Chapter XII. The glass transition temperature was obtained using a calculation software CHEOPS (version 4.0, Million Zillion Software) using the above-described method.

TABLE 1

| | | | | | Ex. 1 | Ex. 2 | Ex. 3 | Ex. 4 | Ex. 5 | Ex. 6 | Ex. 7 | Ex. 8 |
|---|---|---|---|---|---|---|---|---|---|---|---|---|
| Aqueous dispersion | Composite particles (C) | Ethylene-unsaturated carboxylic acid copolymer (A) | Amount blended (parts by mass) | S100 (ethylene in material: 85%) | 200 | — | 1111 | 200 | 200 | — | 200 | 200 |
| | | | | S80N (ethylene in material 80%) | — | 225 | — | — | — | 225 | — | — |
| | | | | S650 (ethylene in material 80%) | — | — | — | — | — | — | — | — |
| | | | Solid content (parts by mass) | | 54 | 54 | 300 | 54 | 54 | 54 | 54 | 54 |
| | | | Degree of neutralization (%) | | 54 | 75 | 54 | 54 | 54 | 75 | 54 | 54 |
| | | Acrylic polymer (B) | Monomer component amount blended (parts by mass) | AN | — | — | — | — | — | — | — | — |
| | | | | ST | — | — | — | — | — | — | 24 | 40 |
| | | | | AAC | — | — | — | — | — | — | — | — |
| | | | | MMA | — | 61 | — | — | — | 53 | — | — |
| | | | | nBMA | 100 | — | 100 | 44 | 100 | 47 | 60 | — |
| | | | | iBA | — | — | — | — | — | — | — | — |
| | | | | nBA | — | 39 | — | 56 | — | — | 16 | 60 |
| | | | (meth)acrylate content (%) | | 100 | 100 | 100 | 100 | 100 | 100 | 76 | 60 |
| | | | Solid content (parts by mass) | | 100 | 100 | 100 | 100 | 100 | 100 | 100 | 100 |
| | | | Tg (° C.) | | 20 | 20 | 20 | −28 | 20 | 60 | 20 | −11 |
| | | Composite ratio (A)/(B) | | | 35/65 | 35/65 | 75/25 | 35/65 | 35/65 | 35/65 | 35/65 | 35/65 |
| | Resin particles (E) | Ethylene-unsaturated carboxylic acid copolymer (A) type | | | S100 | S80N | — | S100 | S100 | S80N | S100 | S100 |
| | | Solid content amount blended (parts by mass) | | | 246 | 246 | — | 346 | 84 | 179 | 84 | 84 |
| | Resin ratio (A)/(B) in solid content | | | | 75/25 | 75/25 | 75/25 | 80/20 | 58/42 | 70/30 | 58/42 | 58/42 |
| Evaluation | Peeling strength | | (g/15 mm) | | 1360 | 1320 | 1180 | 1180 | 1170 | 1150 | 1100 | 1150 |
| | | | | | Excellent | Excellent | Good | Good | Good | Good | Good | Good |
| | Anti-blocking properties | | | | Excellent | Good | Good | Good | Good | Excellent | Good | Good |
| | Polymerization Stability | | | | Good | Good | Good | Good | Good | Good | Good | Good |

| | | | | | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|---|---|---|
| Aqueous dispersion | Composite particles (C) | Ethylene-unsaturated carboxylic acid copolymer (A) | Amount blended (parts by mass) | S100 (ethylene in material: 85%) | 200 | 200 | 200 | — | — | 200 | 200 | — |
| | | | | S80N (ethylene in material 80%) | — | — | — | 225 | — | — | — | — |
| | | | | S650 (ethylene in material 80%) | — | — | — | — | — | — | — | 152 |
| | | | Solid content (parts by mass) | | 54 | 54 | 54 | 54 | — | 54 | 54 | 41 |
| | | | Degree of neutralization (%) | | 54 | 54 | 54 | 75 | — | 54 | 54 | 50 |
| | | Acrylic polymer (B) | Monomer component amount blended (parts by mass) | AN | — | 55 | — | — | — | — | — | — |
| | | | | ST | 55 | — | — | — | — | — | — | — |
| | | | | AAC | — | — | — | — | 5 | — | — | — |
| | | | | MMA | 6 | 6 | 81 | — | — | 30 | — | 55 |
| | | | | nBMA | — | — | 19 | 41 | 95 | 50 | 100 | — |
| | | | | iBA | — | — | — | — | — | — | — | 45 |
| | | | | nBA | 39 | 39 | — | 59 | — | 20 | — | — |
| | | | (meth)acrylate content (%) | | 45 | 45 | 100 | 100 | 95 | 100 | 100 | 100 |
| | | | Solid content (parts by mass) | | 100 | 100 | 100 | 100 | 100 | 100 | 100 | 100 |
| | | | Tg (° C.) | | 20 | 20 | 85 | −30 | 23 | 20 | 20 | 33 |
| | | Composite ratio (A)/(B) | | | 35/65 | 35/65 | 35/65 | 35/65 | Non-composite (Blend) | 35/65 | 35/65 | 29/71 |
| | Resin particles (E) | Ethylene-unsaturated carboxylic acid copolymer (A) type | | | S100 | — | S100 | S80N | S80N | S100 | S100 | — |
| | | Solid content amount blended (parts by mass) | | | 246 | — | 246 | 246 | 300 | 46 | 1846 | — |
| | Resin ratio (A)/(B) in solid content | | | | 75/25 | — | 75/25 | 75/25 | 75/25 | 50/50 | 95/5 | 29/71 |
| Evaluation | Peeling strength | | (g/15 mm) | | 280 | — | 190 | 1130 | 600 | 830 | 20 | 470 |
| | | | | | Bad | — | Bad | Good | Average | Average | Bad | Bad |
| | Anti-blocking properties | | | | Excellent | — | Excellent | Average | Good | Good | Excellent | Good |
| | Polymerization Stability | | | | Good | Bad | Good | Good | Good | Good | Good | Good |

The abbreviations in the Table are described below.

S 100: trade name Chemipearl S 100, ethylene content in the material: 85 mass %, unsaturated carboxylic acid type: methacrylic acid, sodium hydroxide neutralized product, solid content 27%, manufactured by Mitsui Chemicals, Inc.

S 80N: trade name Chemipearl S 80N, ethylene content in the material: 80 mass %, unsaturated carboxylic acid type: acrylic acid, sodium hydroxide neutralized product, solid content 24%, manufactured by Mitsui Chemicals, Inc.

S 650: trade name Chemipearl S 650, ethylene content in the material: 80 mass %, unsaturated carboxylic acid type: methacrylic acid, sodium hydroxide neutralized product, solid content 27%, manufactured by Mitsui Chemicals, Inc.

AN: acrylonitrile
ST: styrene
AAC: acrylic acid
MMA: methyl methacrylate
nBMA: n-butyl methacrylate
iBA: iso-butyl acrylate
nBA: n-butyl acrylate Evaluation 1) Peeling Strength (g/15 mm)

The aqueous dispersion was applied on a hard aluminum foil (thickness 20 μm) with a wire bar so that the applied amount was 3 g/m$^2$, and dried at 120° C. for 1 minute, thereby producing a laminate.

The produced laminate was allowed to stand for a whole day and night under normal temperature, and then cut to a strip having a 15 mm width. The applied surface was put onto a polyvinyl chloride-made sheet (thickness 200 μm), and heat sealing was conducted at 155° C. under a pressure of 196 kPa (2 kg/cm$^2$) for 0.5 seconds. The produced test piece was used to measure the peeling strength under the condition of a tensile speed of 200 mm/min. The evaluation results are shown in Table 1. The peeling strength was evaluated based on the following criteria. The results are shown in Table 1.

Excellent: 1200 g/15 mm or more.
Good: 900 g/15 mm or more and less than 1200 g/15 mm.
Average: 500 g/15 mm or more and less than 900 g/15 mm.
Bad: 500 g/15 mm or less.

2) Anti-Blocking Properties

The produced laminate as described above was cut out into a square of 5 cm by 5 cm, and the applied surfaces were placed on top of another. The anti-blocking properties under conditions of 45° C., 250 g/cm$^2$, and 24 hours were evaluated based on the following criteria. The results are shown in Table 1.

Good: The applied surfaces placed on top of another were released without resistance.
Average: Partially remained on the film (adhesive layer).
Bad: Entirely remained on the film (adhesive layer).

3) Polymerization Stability

The conditions of the aqueous dispersion after producing the composite particles (C) were observed, and evaluated based on the following criteria. The results are shown in Table 1.

Good: No generation of a large amount of coagulation, and flowability was kept.
Average: Generation of a large amount of coagulation, but flowability of the liquid was kept.
Bad: A large amount of coagulation generated, and flowability of the liquid was lost.

DESCRIPTIONS OF REFERENCE NUMERAL 1 laminate
2 substrate
3 adhesive layer
4 adherend While the illustrative embodiments of the present invention are provided in the above description, such is for illustrative purpose only and it is not to be construed as limiting in any manner. Modification and variation of the present invention that will be obvious to those skilled in the art is to be covered by the following claims.

INDUSTRIAL APPLICABILITY

The aqueous dispersion and the laminate of the present invention can be suitably used for a packing material for various industrial products such as, for example, foods such as snacks, tea leaves, and spices; for example, aromatics such as tobacco and aromatic tree; pharmaceutical products; and papers.

The invention claimed is:

1. An aqueous dispersion comprising: a resin component and water that allows the resin component to disperse,
wherein the resin component includes composite particles (C) including an ethylene-unsaturated carboxylic acid copolymer (A) and an acrylic polymer (B), and resin particles (E) composed of an olefinic polymer (D) including the ethylene-unsaturated carboxylic acid copolymer (A),
the ethylene-unsaturated carboxylic acid copolymer (A) is obtained by copolymerizing a first monomer component containing ethylene and unsaturated carboxylic acid, and having an ethylene content of 75 mass % or more,
the acrylic polymer (B) is obtained by polymerizing a second monomer component containing (meth)acrylate and having a (meth)acrylate content of 50 mass % or more,
the acrylic polymer (B) has a glass transition temperature of −28° C. or more and 80° C. or less,
the resin particles (E) content relative to the total amount of the resin component is 5 mass % or more and 80 mass % or less, and
the ethylene-unsaturated carboxylic acid copolymer (A) content relative to the total amount of the resin component is 58 mass % or more and 90 mass % or less.

2. A laminate including a substrate, and an adhesive layer laminated on a surface of at least one side of the substrate,
wherein the adhesive layer is obtained by drying the aqueous dispersion according to claim 1.

3. The laminate according to claim 2, further comprising an adherend layer laminated on a surface of one side of the adhesive layer.

4. The laminate according to claim 3, wherein the adherend layer is composed of polyvinyl chloride and/or polyvinylidene chloride.

* * * * *